United States Patent [19]
Kohler

[11] 4,326,015
[45] Apr. 20, 1982

[54] BATTERY ACTIVATE ASSEMBLY

[75] Inventor: Janet K. Kohler, Palo Alto, Calif.

[73] Assignee: The United States of America as represented by the Secretary of the Navy, Washington, D.C.

[21] Appl. No.: 953,670

[22] Filed: Oct. 23, 1978

[51] Int. Cl.³ .......................................... H01M 10/44
[52] U.S. Cl. ...................................... 429/52; 429/70; 429/72; 429/116; 137/260
[58] Field of Search .................... 429/116, 70, 72–81, 429/52; 137/68, 260; 141/237

[56] References Cited

U.S. PATENT DOCUMENTS

| | | | |
|---|---|---|---|
| 1,942,908 | 1/1934 | Swain et al. | 137/68 |
| 2,001,210 | 5/1935 | Morse | 136/102 |
| 2,161,776 | 6/1939 | Orr | 137/68 |
| 3,072,545 | 1/1963 | Juda et al. | 204/112 |
| 3,343,994 | 9/1967 | Stanimirovitch | 429/116 X |
| 3,510,361 | 5/1970 | Saunders | 136/162 |
| 3,536,536 | 10/1970 | Lucas | 429/116 X |
| 3,550,651 | 12/1970 | McKellen et al. | 141/198 |
| 3,561,505 | 2/1971 | Ryder | 141/237 |

Primary Examiner—Charles F. LeFevour
Attorney, Agent, or Firm—R. F. Beers; Charles D. B. Curry; Francis I. Gray

[57] ABSTRACT

A battery activate assembly having an enclosed box with multiple cavities and a storage area. A valve is attached to the lid of the box for connection to a vacuum pump. Each cavity has a needle nozzle projecting beyond the box for connection to tubing which is adapted to be attached at the other end to an individual battery cell. A knife edge is provided in each cavity to pierce the membrane of an electrolyte bottle when inserted into the cavity to allow the electrolyte to flow from the cavity through the needle nozzle and tubing into the battery cell.

15 Claims, 3 Drawing Figures

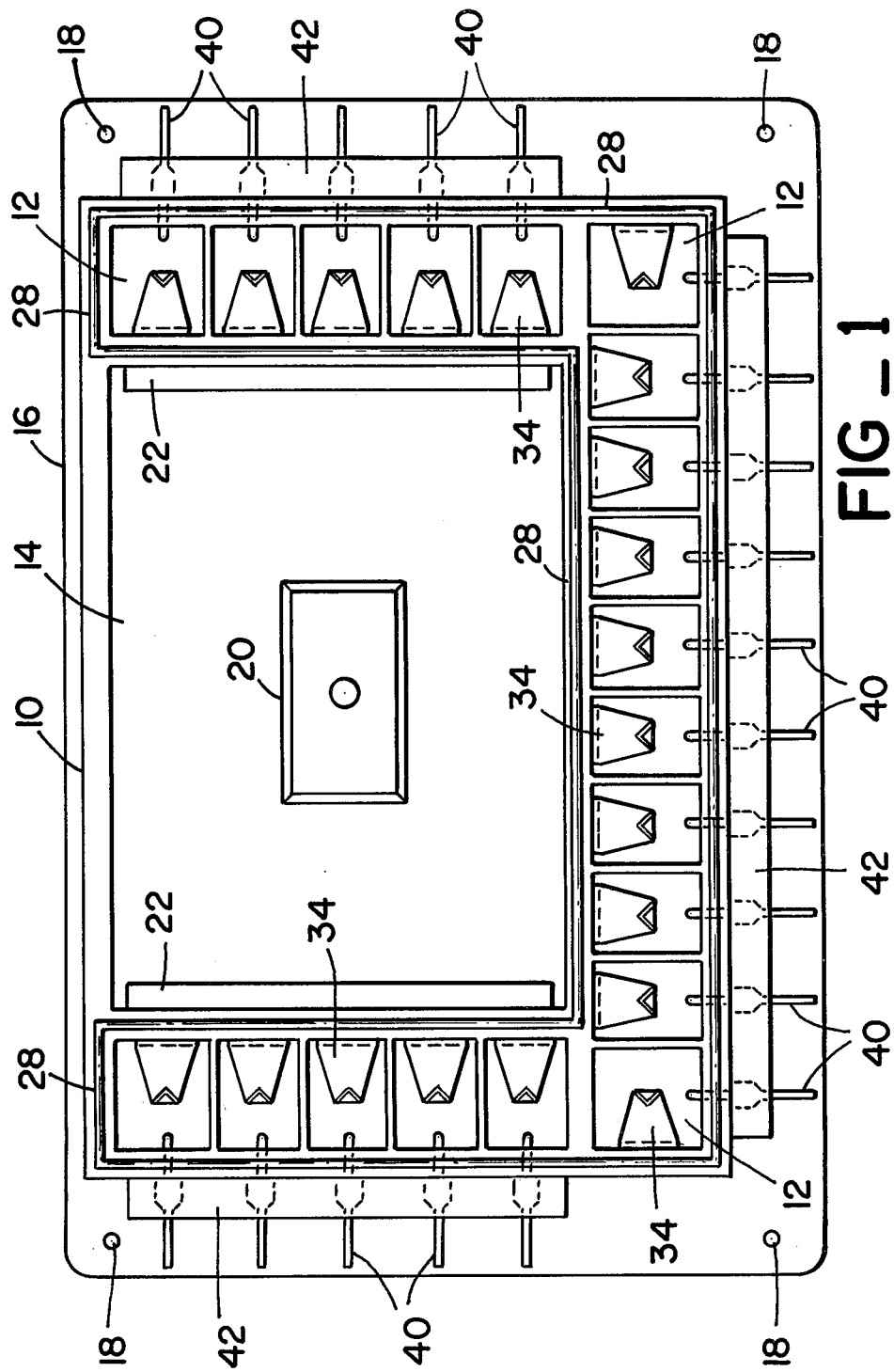
FIG_1

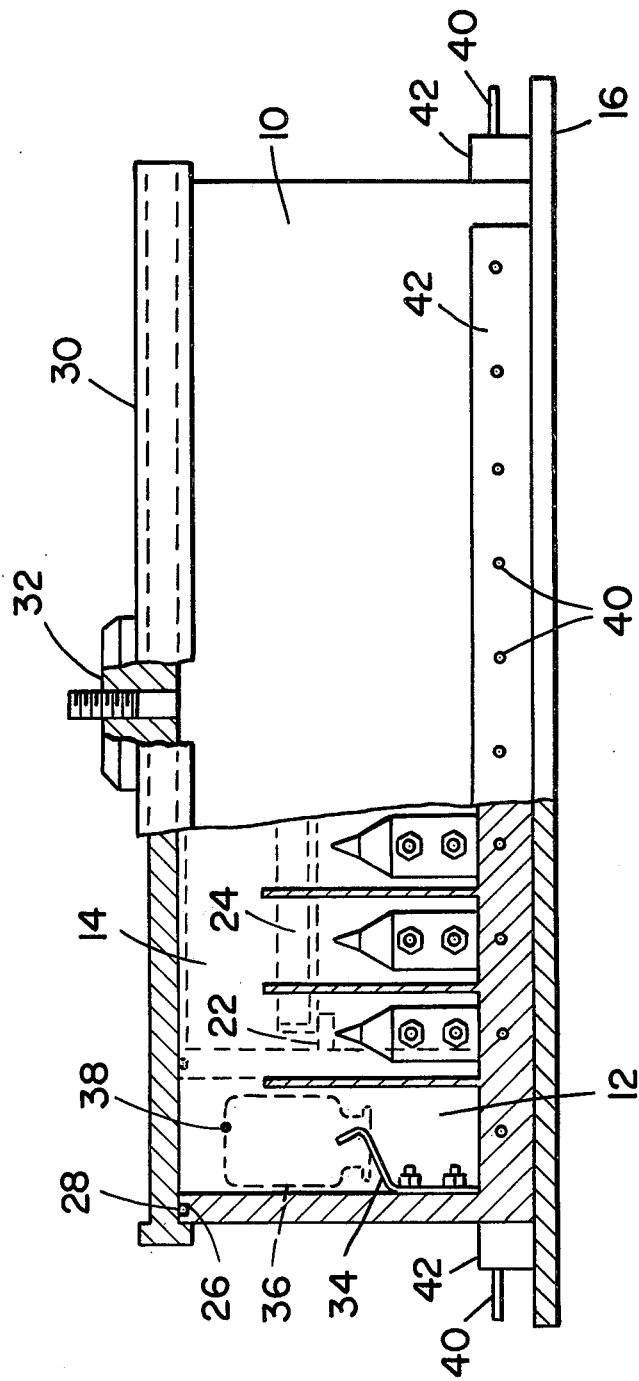
FIG_2

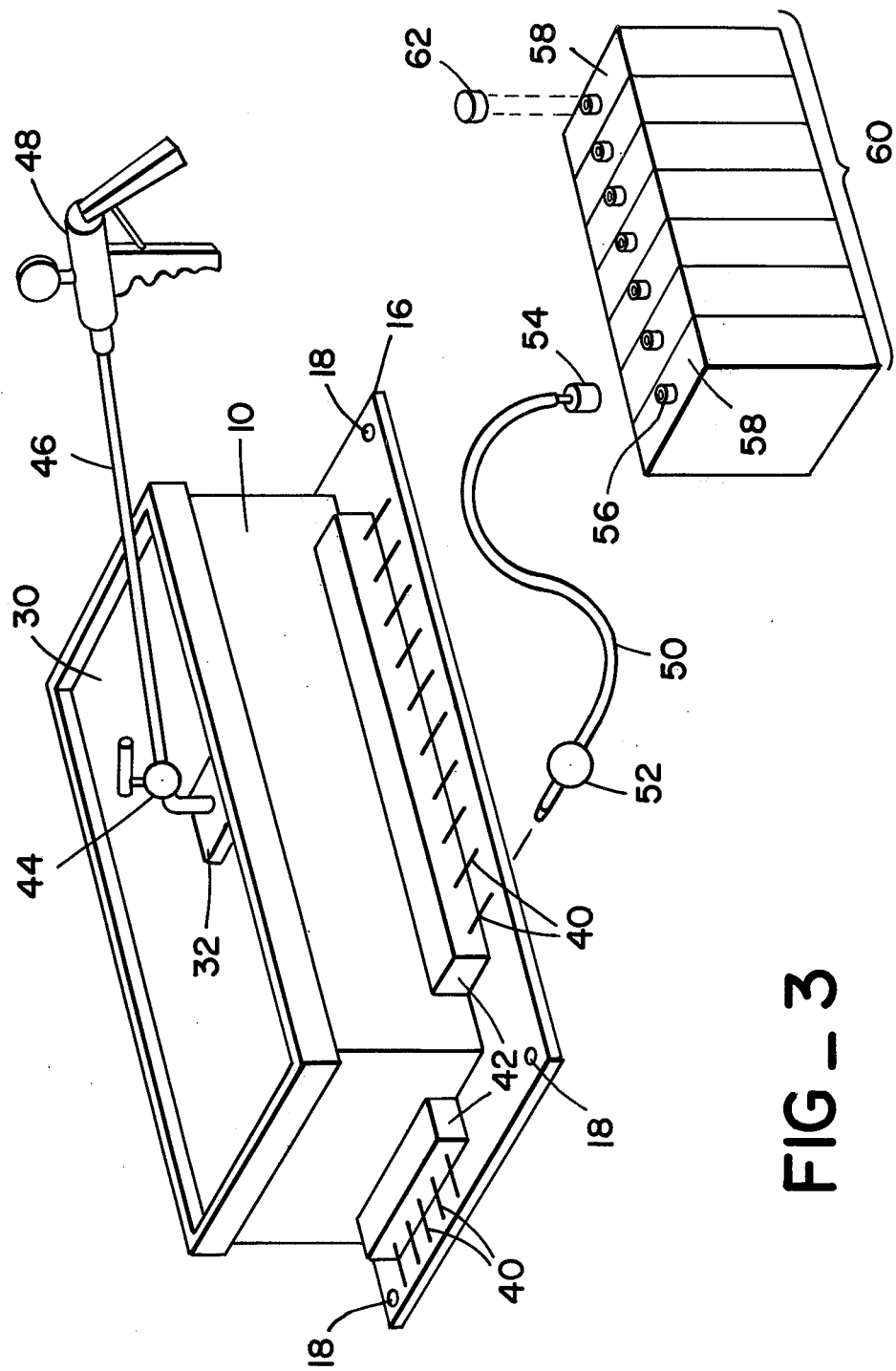
FIG_3

BATTERY ACTIVATE ASSEMBLY

BACKGROUND OF THE INVENTION

1. Field of the Invention

The present invention relates to battery activation devices, and more particularly to a portable battery activation assembly for filling and refilling individual battery cells with a fluid electrolyte without removing the cells from the battery case.

2. Description of the Prior Art

The electrolyte for many types of batteries, such as those for aerospace applications, is pre-measured and stored in plastic "squeeze" bottles. To fill such a battery the cells are removed from the battery case, the vent caps are removed and nozzle caps installed. The cell is filled by squeezing the contents of the electrolyte bottle into the cell through the nozzle cap which causes bubbles to form in the cell. The cell may also be filled by using a hypodermic needle and syringe to withdraw the electrolyte from the bottle and insert it into the cell. The bubbles are removed by placing the cells, having been returned to the battery case, in a vacuum chamber resulting in an electrolyte overflow. The cell is then topped off from the "squeeze" bottle or hypodermic syringe and the steps repeated. This is a time consuming process with the considerable manual contact and attendant danger to personnel from the toxic electrolyte. Also, the battery must be taken to the vacuum chamber area for filling since the chamber is not portable and requires an external electrical connection. Finally, there is no reliable way of assuring that each cell has its required electrolyte capacity.

SUMMARY OF THE INVENTION

Accordingly, the present invention provides a battery activate assembly for filling individual cells of a battery with an electrolyte. An enclosed box has multiple cavities and a storage area. A valve is attached to the box lid to which a vacuum pump can be connected. Each cavity has a needle nozzle projecting external to the box to which tubing is attached. An adaptor is fitted into the other end of the tubing, the adaptor connecting the tubing to an individual battery cell. A knife edge in each cavity pierces the membrane of an electrolyte bottle to allow the electrolyte to flow from the bottle into the cavity and through the needle nozzle and tubing to the individual battery cell.

Therefore, it is an object of the present invention to provide a battery activate assembly for filling individual battery cells with electrolyte in a simple, safe and fast manner.

Another object of the present invention is to provide a battery activate assembly which fills the individual battery cells without removing the cells from the battery case.

Still another object of the present invention is to provide a battery activate assembly which is portable.

Yet another object of the present invention is to provide a battery activate assembly which uses a portable vacuum pump rather than a large, stationary vacuum pump and chamber with electrical connections.

Other objects, advantages and novel features will be apparent from the following detailed description when read in view of the appended claims and attached drawing.

BRIEF DESCRIPTION OF THE DRAWING

FIG. 1 is a top plan view of the box of the battery activate assembly without the lid.

FIG. 2 is a side view in partial-section of the box of the battery activate assembly.

FIG. 3 is a perspective schematic view of the battery activate assembly.

DESCRIPTION OF THE PREFERRED EMBODIMENT

Referring now to FIGS. 1 and 2, a box 10 having a plurality of cavities 12 and a storage area 14 is mounted on a base 16 which has means such as holes 18 for mounting on an approximately horizontal surface. An interior storage box 20 integral with the bottom of the box 10 is located in the storage area 14. A ledge 22, located along the wall of the storage area 14, supports a storage tray 24 over the interior storage box 20. The wall of the box 10 which encloses the cavities 12 has a groove 26 in which is located an O-ring 28. A lid 30 has a connector 32 integral therewith. The connector 32 is located such that when the lid 30 is on the box 10, the connector is within the area of the cavities 12 surrounded by the O-ring 28. The O-ring 28 forms an airtight seal with the lid 30 to enable evacuation or pressurization of the cavities 12 via the connector 32.

A knive 34 is fixedly located in each cavity 12. An electrolyte bottle 36 having a membrane over the mouth, when inserted into the cavity 12 mouth down, will have the membrane punctured by the knive 34 to allow the electrolyte to drain into the cavity. A hole 38 punched in the bottom of the bottle 36 aids in draining the electrolyte into the cavity 12. A needle nozzle 40 in a mounting block 42 penetrates the bottom of each cavity 12 to allow the electrolyte to drain from the cavity.

A valve 44 is attached to the connector 32 via an elbow. A hose 46 connects a vacuum pump 48 to the valve 44. A plurality of tubes 50 are connected, one to each needle nozzle 40. A hose clamp 52 is affixed to the tube 50 near the needle nozzle 40. A cell adaptor 54 is fitted into the oppsite end of the tube 50. The cell adaptor 54 connects to the vent 56 of an individual battery cell 58 of a battery 60.

In operation as shown in FIG. 3 the base 16 is clamped to a relatively horizontal surface, or otherwise secured via holes 18, at a height above the battery 60 to be filled. The hose clamp 52 is slipped over one end of the tubing 50, and that end is attached to one of the needle nozzles 40. The cell adaptor 54 is fitted into the tubing 50 at the other end, the adaptor connecting the tubing to an individual battery cell vent 56 after a vent cap 62 is removed. The hose clamp 52 is opened and the lid 30 is placed on the box 10, with the O-ring 28 making a tight seal. The vacuum pump 48, either manually or electrically operated, is connected via hose 46 to the valve 44, the valve being attached to connector 32 on the lid 30. Vacuum is created by the vacuum pump 48 to remove all air from the cell 58. The hose clamp 52 is closed and the lid 30 is removed from the box 10. The electrolyte bottle 36 is pushed into the cavity 12 connected to the cell 58. Twisting the bottle 36 causes the knife 34 to break the membrane seal and release the electrolyte into the cavity 12. Puncturing the bottle bottom to cause a hole 38 assists the flow of electrolyte from the bottle 36. Opening of the hose clamps 52 allows the electrolyte to flow into the cell 58 assisted by gravity and the vacuum in the cell. The lid 30 may be replaced on the box 10 and pressure applied through valve 44 to assure complete transfer of electrolyte from the cavity 12 into the cell 58. The final step is closure of the hose clamp 52 and removal of the cell adaptor 54. The vent cap 62 is then replaced on the vent 56 of the cell 58.

The small items, such as the hose clamps 52 and cell adaptors 54, may be stored in the interior storage box 20 with the tubing 50 wrapped loosely around the interior storage box in the storage area 14. The valve 44 may be left attached to the connector 32, and the hose 46 and vacuum pump 48 may be stored in the tray 24 which is placed in the storage area 14 to rest on ledges 22. The lid 30 is turned over so the connector 32 is interior of the box 10 over the cavities 12. Between uses the entire assembly is flushed with distilled water to remove any residual traces of electrolyte.

The material of the box 10 and lid 30 may be of any suitable composition, such as bonded plexiglass, which is immune to reaction with the electrolyte, which may be potassium hydroxide or the like. Tygon ® tubing may be used for the tubing 50, or any other suitable electrolyte-resistant tubing.

Thus, the present invention provides a lightweight, portable battery activate assembly for filling individual battery cells which requires little handling of the hazardous electrolyte, improving safety, and which is fast and reliable.

What is claimed is:

1. A battery activate assembly for filling a battery with a fluid electrolyte comprising:
   (a) a box having a cavity, said cavity having an exit hole;
   (b) means for puncturing the seal of a bottle containing said fluid electrolyte when said bottle is inverted and inserted into said cavity, said puncturing means being situated in said cavity so that said fluid electrolyte fills said cavity when said seal is punctured; and
   (c) means for conveying said fluid electrolyte from said cavity via said exit hole to an individual cell of said battery.

2. A battery activate assembly as recited in claim 1 further comprising means for evacuating said individual cell of said battery via said cavity through said conveying means to remove any air in said cell prior to filling said individual cell with said electrolyte fluid.

3. A battery activate assembly as recited in claim 2 wherein said evacuating means comprises:
   (a) a lid for said box, said box having a seal so that when said lid is placed on said box said cavity is fluid tight;
   (b) a valve connected to said lid situated to provide access to said cavity; and
   (c) a vacuum pump connected to said valve for evacuating said individual cell via said cavity through said conveying means.

4. A battery activate assembly as recited in claims 1 or 2 wherein said conveying means comprises:
   (a) a needle nozzle inserted into said exit hole of said cavity;
   (b) an adaptor connected to the vent of said individual cell of said battery; and
   (c) tubing attached at one end to said needle nozzle and at the other end to said adaptor.

5. A battery activate assembly as recited in claim 4 wherein said conveying means further comprises a hose clamp slipped over the end of said tubing attached to said needle nozzle to control the flow of fluid through said tubing.

6. A battery activate assembly as recited in claim 4 wherein said tubing and said box comprise materials which are immune to reaction with said fluid electrolyte.

7. A battery activate assembly as recited in claim 6 wherein said material of said box is bonded plexiglass.

8. A battery activate assembly as recited in claim 6 wherein said material of said tubing is polyvinyl chloride.

9. A battery activate assembly as recited in claims 1 or 2 further comprising a storage cavity within said box in which the various components of said battery activate assembly are stored when not being used.

10. A battery activate assembly as recited in claim 1 or 2 wherein said puncturing means comprises a knife edge fixedly situated within said cavity so that the seal of said bottle is punctured when said bottle is inserted into said cavity.

11. A method for activating individual cells of a battery with a fluid electrolyte comprising the steps of:
   (a) inserting a bottle containing said fluid electrolyte into a cavity of a box, said cavity having a knife edge, such that the seal of said bottle is punctured and said fluid electrolyte fills said cavity; and
   (b) conveying said fluid electrolyte from said cavity via a hole therein to an individual cell of said battery.

12. An activating method as recited in claim 11 further comprising the step of first evacuating said individual cell of said battery by creating a vacuum via said cavity.

13. An activating method as recited in claim 12 wherein said evacuating step comprises the steps of:
   (a) connecting tubing from said cavity to said individual cell;
   (b) closing said box with a lid to provide an airtight seal about said cavity;
   (c) connecting a vacuum pump to a connector on said lid which has access to said cavity;
   (d) opening a hose clamp on said tube;
   (e) activating said vacuum pump to create said vacuum; and
   (f) closing said hose clamp to maintain said vacuum in said individual cell when said lid is removed.

14. An activating method as recited in claim 13 wherein said conveying step comprises the step of opening said hose clamp to allow said fluid electrolyte to flow from said cavity through said tubing into said individual cell.

15. An activating method as recited in claims 11 or 12 further comprising the step of pressurizing said cavity to assure that all said fluid electrolyte is conveyed from said cavity to said individual cell.

* * * * *